United States Patent Office 2,889,334
Patented June 2, 1959

---

2,889,334

IMIDAZOLINE DERIVATIVES

William B. Hughes, Webster Groves, Mo., assignor to Cities Service Research and Development Company, New York, N.Y., a corporation of New Jersey No Drawing. Application January 17, 1956
Serial No. 559,513

8 Claims. (Cl. 260—309.6)

---

This invention relates to new compositions of matter, and more particularly relates to improved compositions and processes for inhibiting corrosion of metals.

It is generally recognized that oil-producing formations often yield with the crude oil brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials therein.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

I have discovered that certain new compositions of matter prepared by reacting a polyethyleneamine with a dibasic acid to obtain an intermediate reaction product which is thereafter reacted with dicyanodiamide possess unexpected and uniquely effective corrosion inhibiting properties. The new compounds of my invention are bis-imidazoline-2-imidazoline-guanylimines or bis-imidazoline-2,2'-diimidazolone-guanylimines, and are prepared by reacting 1,2 diamines with dibasic acids in the molar ratio of 2 mols of the diamine to 1 mol of the dicarboxylic acid to provide an intermediate reaction product which is thereafter reacted with 1 to 2 mols of dicyanodiamide to provide the bis-imidazoline-2-imidazolone-guanylimines when 1 mol of dicyanodiamide is used, and the bis-imidazoline-2,2'-diimidazolone-guanylimines when 2 mols of dicyanodiamide are reacted with the intermediate reaction product.

The reaction utilized in preparing the new compounds of my invention may be represented as follows:

$2NH_2CH_2CH_2NHCH_2CH_2NHCH_2CH_2NH_2 + HOOC-(A)-COOH \longrightarrow$

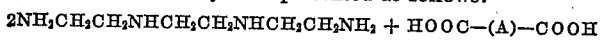
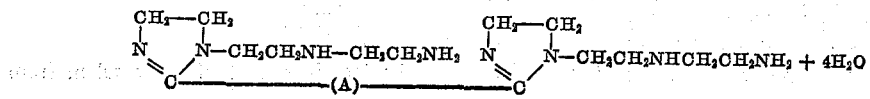

In the intermediate reaction product above, A represents the acid residue of the dicarboxylic acid. To obtain the new compounds or final reaction product which I have found to be effective inhibitors, the intermediate reaction product above is further reacted with 1 or 2 mols of dicyanodiamide to provide a final reaction product having the following formula:

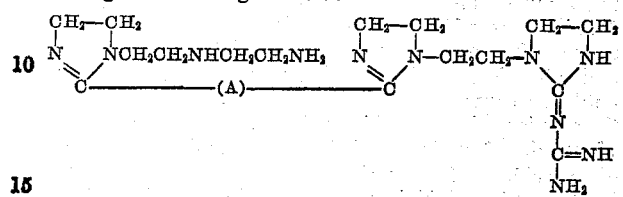

In preparing the compounds of my invention, 2 mols of a 1,2 diamine are reacted in the presence of an azeotrope-forming solvent to provide an intermediate bis-imidazoline reaction product by eliminating from the reaction mixture 4 mols of water. Removal of water is accomplished by azeotrope distillation, with the collected water being used as a measure of the completion of initial reaction. After removal of the azeotrope-forming solvent from the reaction mixture, the intermediate product is reacted with 1 or 2 mols of dicyanodiamide, with a small amount of hydrochloric acid being added toward the end of the reaction so that the liberated ammonia may be removed as ammonium chloride.

In carrying out this reaction, I have found that the 1,2 diamines such as triethylene tetramine and tetraethylene pentamine are particularly satisfactory. In preparing the intermediate product, any dicarboxylic acid having from 2 to about 20 carbon atoms of aliphatic or aromatic structure, either substituted or unsubstituted, may be used. Among the preferred dicarboxylic acids are the following: succinic, sebacic, terephthalic, dimerized linoleic, adipic, glutaric, pimelic, suberic, and azelaic. It is, of course, to be understood that in addition to the dicarboxylic acids referred to, dicarboxylic acids having unsaturated or branched chains may be used, as well as acids having various substituents such as hydroxyl groups.

In order to more fully understand the nature of the new compounds of my invention, the manner in which they are prepared, and their effectiveness in inhibiting corrosion, the following specific examples are provided:

EXAMPLE 1

To 36 grams of dimerized linoleic acid prepared according to the method described in "The Journal of the Oil Chemist Society 24," 65, March 1947, and hereafter referred to as dimer acid, 29.2 grams of triethylenetetramine were added. 50 ml. of benzene were then added, and the reaction mixture heated under a water trap condenser to distill a water benzene azeotrope, with benzene being returned continuously to the reaction mixture through the decanter still head. After a four hour heating period, 6.9 grams of water had been collected, representing the theoretical quantity that would have been recovered in the reaction of 2 mols of triethylene tetramine with 1 mol of dimer acid. Upon recovery of substantially the theoretical amount of water required to obtain the imidazoline ring closure in the bis-imidazoline intermediate product, the benzene was distilled from the mixture, providing an intermediate product having a molecular weight of 815, which is comparable to the theoretical molecular weight of 820 for this intermediate compound.

To 1 gram molecular weight of the intermediate product, 84 grams (1 gram mol) of dicyanodiamide were added, and the mixture heated to cause removal of ammonia. A small amount of acid was added after the initial reaction to force the action to completion by the removal of ammonia as ammonium chloride. The final product obtained had a molecular weight of 376, and is identified as inhibitor number 1 in the table which follows.

EXAMPLE 2

To 1 gram mol of the final product obtained according to Example 1 above, an additional gram mol of dicyanodiamide was added, together with one-quarter mol of aqueous hydrochloric acid. The mixture was heated until all evidence of a reaction was completed, that is, until there was no further liberation of ammonia from the reaction mixture. This product represents the product of reacting 2 mols of triethylene tetramine, 1 mol of dimer acid, and 2 mols of dicyanodiamide. This product is identified as inhibitor number 9 in the table which follows.

EXAMPLE 3

Following the procedure set forth in Example 1 above, 1 gram mol of triethylene tetramine was reacted with 41.5 grams (0.5 mol) of terephthalic acid in the presence of a benzene solvent. After removal of water as a benzene-water azeotrope and removal of the benzene solvent, an intermediate bis-imidazoline reaction product was obtained. This intermediate reaction product was light yellow in color, and had a molecular weight of 380, as compared to a theoretical molecular weight value of 382. This intermediate product was thereafter reacted with 1 mol of dicyanodiamide to provide a final reaction product identified in the table which follows as inhibitor number 3.

The product identified as inhibitor number 3 described above was thereafter reacted with an additional mol of dicyanodiamide to produce a yellow glass-like product which was soluble in oil and dispersible in water, and is identified as inhibitor number 11 in the table.

EXAMPLE 4

30 grams (0.05 mol) of dimer acid were reacted with 18.9 grams (0.1 mol) of tetraethylene pentamine in the presence of 50 ml. of benzene, with water being removed from the reaction mixture to produce an intermediate bis-imidazoline product having a molecular weight of 900. This is to be compared with a theoretical molecular weight valve of 902 for this intermediate compound.

To 0.1 mol of the intermediate product, 0.1 mol of dicyanodiamide was added to produce a bis-imidazoline-2-imidazolone-guanylimine having a molecular weight of 963. This final reaction product is identified as inhibitor number 5 in the table.

EXAMPLE 5

To 96.7 grams (0.1 mol) of the final reaction product above, identified as inhibitor number 5, an additional 0.1 mol of dicyanodiamide was added, with the mixture being heated at a temperature of 200–250° C. for two and one-half hours, with ammonia being liberated from the reaction mixture. The final reaction product was dark in color, oil-soluble, and a semi-solid at room temperature. This product is identified as inhibitor number 13 in the table which follows.

EXAMPLE 6

Following the procedure of Example 1, 189 grams (1.0 mol) of tetraethylene pentamine were reacted with 101 grams (0.5 mol) of sebacic acid to form an intermediate reaction product which was thereafter reacted with 42 grams (0.5 mol) of dicyanodiamide to provide a final reaction product having a molecular weight of 561. This compound, which has a theoretical molecular weight of 575, is identified as inhibitor number 8 in the table.

The product identified as inhibitor number 8 in the preceding paragraph was thereafter treated with an additional mol of dicyanodiamide in a 1:1 molar ratio to produce a dark yellow, oil-soluble, semi-solid product identified as inhibitor number 16 in the table.

The new compounds of my invention as previously indicated have been found to be unexpectedly effective corrosion inhibitors. The effectiveness of my new compositions in reducing the corrosiveness of oil field brine may be more fully understood by reference to certain tests which I have conducted, using prepared brines to substantially duplicate well conditions. The test procedure involved a measurement of the corrosive action of a hypothetical well fluid as inhibited with compositions described above upon weighed, cleaned, and polished strips of number 18 gauge cold-rolled steel measuring one-quarter inch by four inches, under conditions closely approximating those existing in a producing well, and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison (a blank) for each of the corrosion inhibitors being tested. To cleaned and number one liter Erlenmeyer flasks, 600 ml. of a 5 weight percent aqueous sodium chloride solution and 400 ml. of depolarized kerosene were added. A stopper, provided with gas inlet and outlet ports, was inserted in the flask, and natural gas or nitrogen was blown through the brine solution for about one hour to purge any oxygen present. After the purging was completed, the corrosion inhibitor being tested was added to each flask in amounts of 10 and 25 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steep strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheese cloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus, a protection percent may be calculated for each of the test strips taken from the inhibited test fluids in accordance with the following formula:

$$\frac{L1 - L2}{L1} \times 100$$

in which L1 is the loss in weight of strips taken from uninhibited test fluids, and L2 is the loss in weight of strips which were subjected to inhibited test fluids.

The results of tests carried out with the new compounds of my invention are summarized in the table below. Under "Percent Protection," two columns are provided for respective test results obtained when utilizing 10 and 25 p.p.m. of the compounds identified.

Table

| Inhibitor No. | Formulation | Mol. ratio of reactants | Percent protection | |
|---|---|---|---|---|
| | | | 10 p.p.m. | 25 p.p.m. |
| 1 | TETA dimer acid dicy | 2:1:1 | 88.9 | 97.8 |
| 2 | TETA succinic acid dicy | 2:1:1 | 83.8 | 91.9 |
| 3 | TETA terephthalic acid dicy | 2:1:1 | 92.0 | 96.8 |
| 4 | TETA sebacic acid dicy | 2:1:1 | 94.1 | 98.7 |
| 5 | TEPA dimer acid dicy | 2:1:1 | 90.4 | 93.8 |
| 6 | TEPA succinic acid dicy | 2:1:1 | 81.8 | 90.4 |
| 7 | TEPA terephthalic acid dicy | 2:1:1 | 97.2 | 99.1 |
| 8 | TEPA sebacic acid dicy | 2:1:1 | 96.8 | 97.3 |
| 9 | TETA dimer acid dicy | 2:1:2 | 90.3 | 99.0 |
| 10 | TETA succinic acid dicy | 2:1:2 | 91.3 | 98.7 |
| 11 | TETA terephthalic acid dicy | 2:1:2 | 97.8 | 99.1 |
| 12 | TETA sebacic acid dicy | 2:1:2 | 96.1 | 99.0 |
| 13 | TEPA dimer acid dicy | 2:1:2 | 91.7 | 98.6 |
| 14 | TEPA succinic acid dicy | 2:1:2 | 97.0 | 97.8 |
| 15 | TEPA terephthalic acid dicy | 2:1:2 | 92.1 | 99.1 |
| 16 | TEPA sebacic acid dicy | 2:1:2 | 93.0 | 99.0 |

It will be evident from the table that corrosion may be effectively reduced to a value of one-tenth or less of that due to the natural flow of well fluids or brines, through the well tubing, pipe lines and associated equipment by incorporating in the well fluid comparatively small quantities of the new compounds of my invention.

While the final reaction products previously described are extremely effective in inhibiting corrosion, I have found that neutralization of these products with from 1 to 2 mols of a mono or dicarboxylic acid to provide the acid salts of these compounds further enhances their effectiveness in inhibiting corrosion. If desired, salts of mineral acids of these final reaction products, that is, for example, hydrochloric acid salts of bis-imidazoline-2-imidazolone-guanylimines, are also effective for this purpose.

In using my improved compositions for protecting the piping, casings, and other equipment which comes in contact with the corrosive fluids, I have found that excellent results may be obtained by injecting an appropriate quantity, generally not more than 100 p.pm., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved compositions is not fully understood, but apparently the bis-imidazoline-2-imidazolone-guanylimines and bis-imidazoline-2,2'-diimidazolone-guanylimines of this invention preferentially wet the surface of the metal with oil, thus excluding the brine from contact with the metal. In any event, however, despite the lack of a complete understanding of the mechanics of the corrosion inhibiting effect, the compounds of my invention are extremely and surprisingly effective in protecting oil well and oil field equipment from corrosion, even when used in amounts of 50 p.p.m. or less, based on the oil content of the well fluid.

It is to be understood that the improved compositions of my invention are not limited to use alone and may be applied along with other agents commonly introduced in the producing oil wells for breaking emulsions, preventing scale formation, minimizing pitting, etc. It is further evident that my invention is not restricted to the use of improved compositions for inhibiting corrosion in oil wells, but may be employed to perform this function in the presence of corrosive fluids derived from other sources.

Having now described my invention, what I claim as new and useful is:

1. As a new composition of matter, a compound having the formula

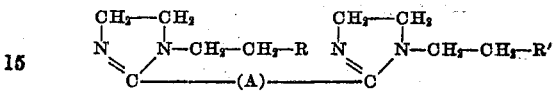

wherein A is a hydrocarbon radical selected from the group consisting of a non-acetylenic aliphatic hydrocarbon radical having from 2 to 20 carbon atoms, phenylene radical and the hydrocarbon radical of dimerized linoleic acid, R is selected from the group consisting of

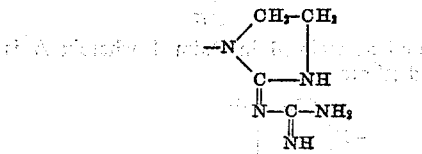

and

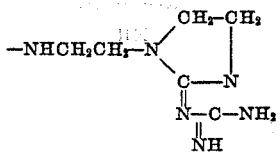

and R' is selected from the group consisting of

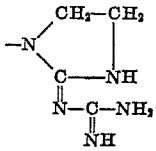

and

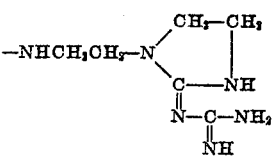

2. A compound as claimed in claim 1 wherein A is $C_{34}H_{62}$, R is —$NHCH_2CH_2NH_2$ and R' is

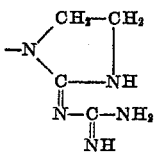

3. A compound as claimed in claim 1 wherein A is $C_{34}H_{62}$, R is —$NHCH_2CH_2NHCH_2CH_2NH_2$ and R' is

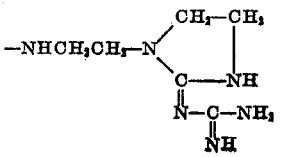

4. A compound as claimed in claim 1 wherein A is $C_6H_4$, R is —$NHCH_2CH_2NH_2$ and R' is

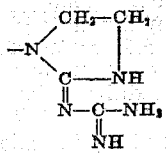

5. A compound as claimed in claim 1 wherein A is $C_8H_{16}$, R is —$NHCH_2CH_2NHCH_2CH_2NH_2$ and R' is

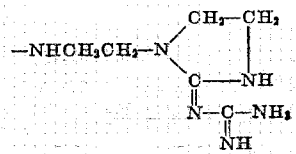

6. A compound as claimed in claim 1 wherein A is $C_8H_{16}$, and R and R' are

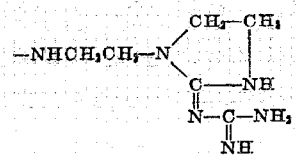

7. A compound as claimed in claim 1 wherein A is $C_2H_4$ and R and R' are

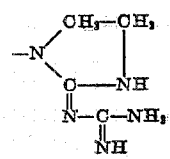

8. A compound as claimed in claim 1 wherein A is $C_{34}H_{62}$ and R and R' are

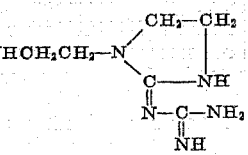

References Cited in the file of this patent
UNITED STATES PATENTS

| | | |
|---|---|---|
| 2,468,163 | Blair et al. | Apr. 26, 1949 |
| 2,483,969 | Gajewski | Oct. 4, 1949 |
| 2,622,075 | Hemmi et al. | Dec. 16, 1952 |
| 2,643,978 | Hughes | June 30, 1953 |
| 2,646,399 | Hughes | July 21, 1953 |
| 2,713,583 | Smith | July 19, 1955 |
| 2,781,352 | De Groote | Feb. 12, 1957 |

FOREIGN PATENTS

| | | |
|---|---|---|
| 501,522 | Great Britain | Feb. 28, 1939 |
| 593,659 | Great Britain | Oct. 22, 1947 |
| 253,709 | Switzerland | Nov. 16, 1948 |

UNITED STATES PATENT OFFICE

CERTIFICATE OF CORRECTION

Patent No. 2,889,334                                   June 2, 1959

William B. Hughes

It is hereby certified that error appears in the printed specification of the above numbered patent requiring correction and that the said Letters Patent should read as corrected below.

Column 1, line 31, for "been used as formaldehyde" read -- been used such as formaldehyde --; column 3, line 50, for "valve" read -- value --.

Signed and sealed this 10th day of November 1959.

(SEAL)
Attest:

KARL H. AXLINE

Attesting Officer

ROBERT C. WATSON
Commissioner of Patents